June 30, 1970  E. W. BOWEN  3,517,476

METHOD AND APPARATUS FOR CLOSING CONTAINERS

Filed April 27, 1967  5 Sheets-Sheet 1

INVENTOR:
ELDRED W. BOWEN
BY Gravely, Lieder & Woodruff
ATTORNEYS.

June 30, 1970  E. W. BOWEN  3,517,476
METHOD AND APPARATUS FOR CLOSING CONTAINERS
Filed April 27, 1967  5 Sheets-Sheet 2
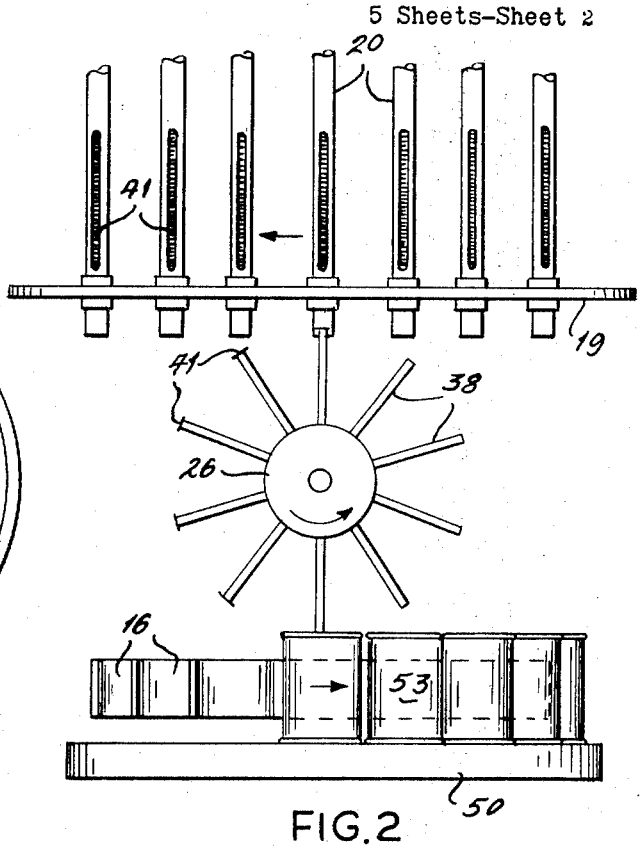
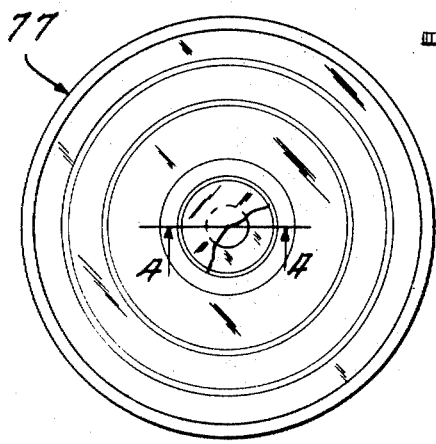
FIG. 3
FIG. 2
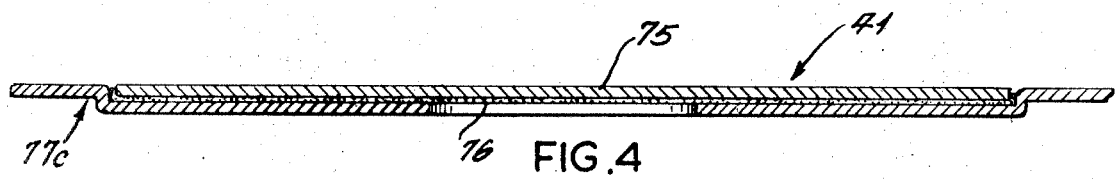
FIG. 4
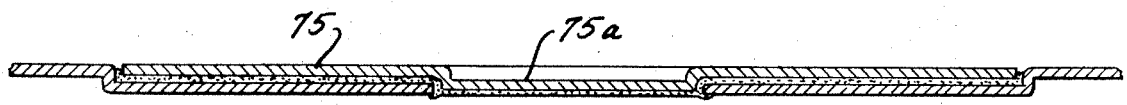
FIG. 5
INVENTOR:
ELDRED W. BOWEN
BY
Gravely, Lieder & Woodruff
ATTORNEYS.

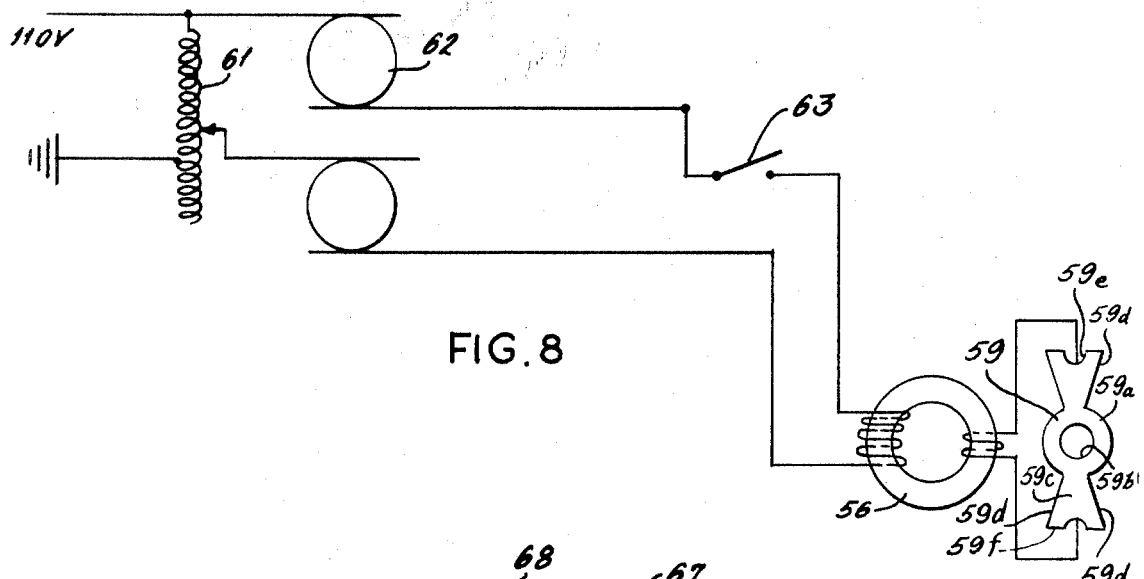
FIG. 8
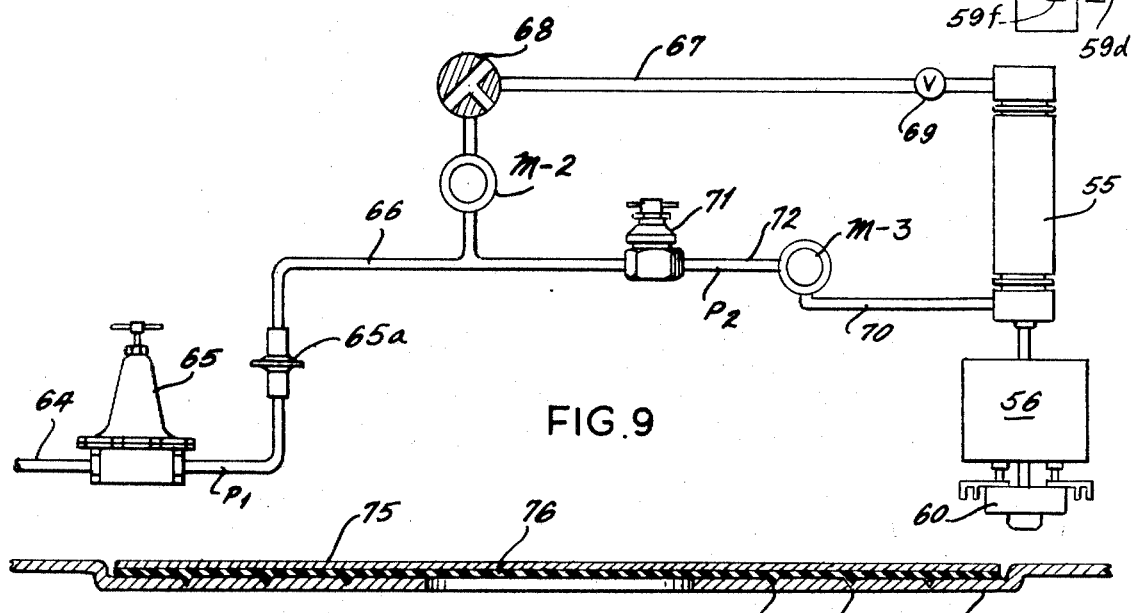
FIG. 9
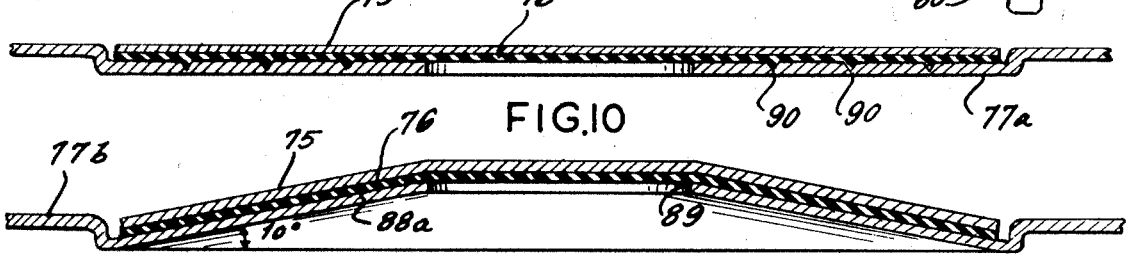
FIG. 10
FIG. 11
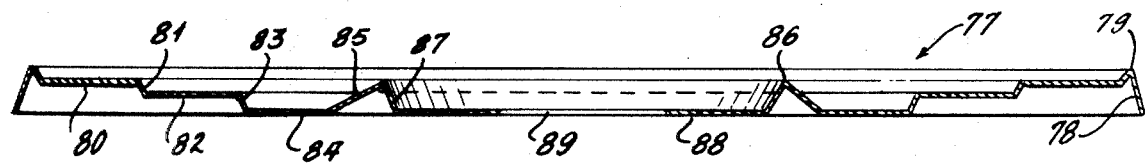
FIG. 12

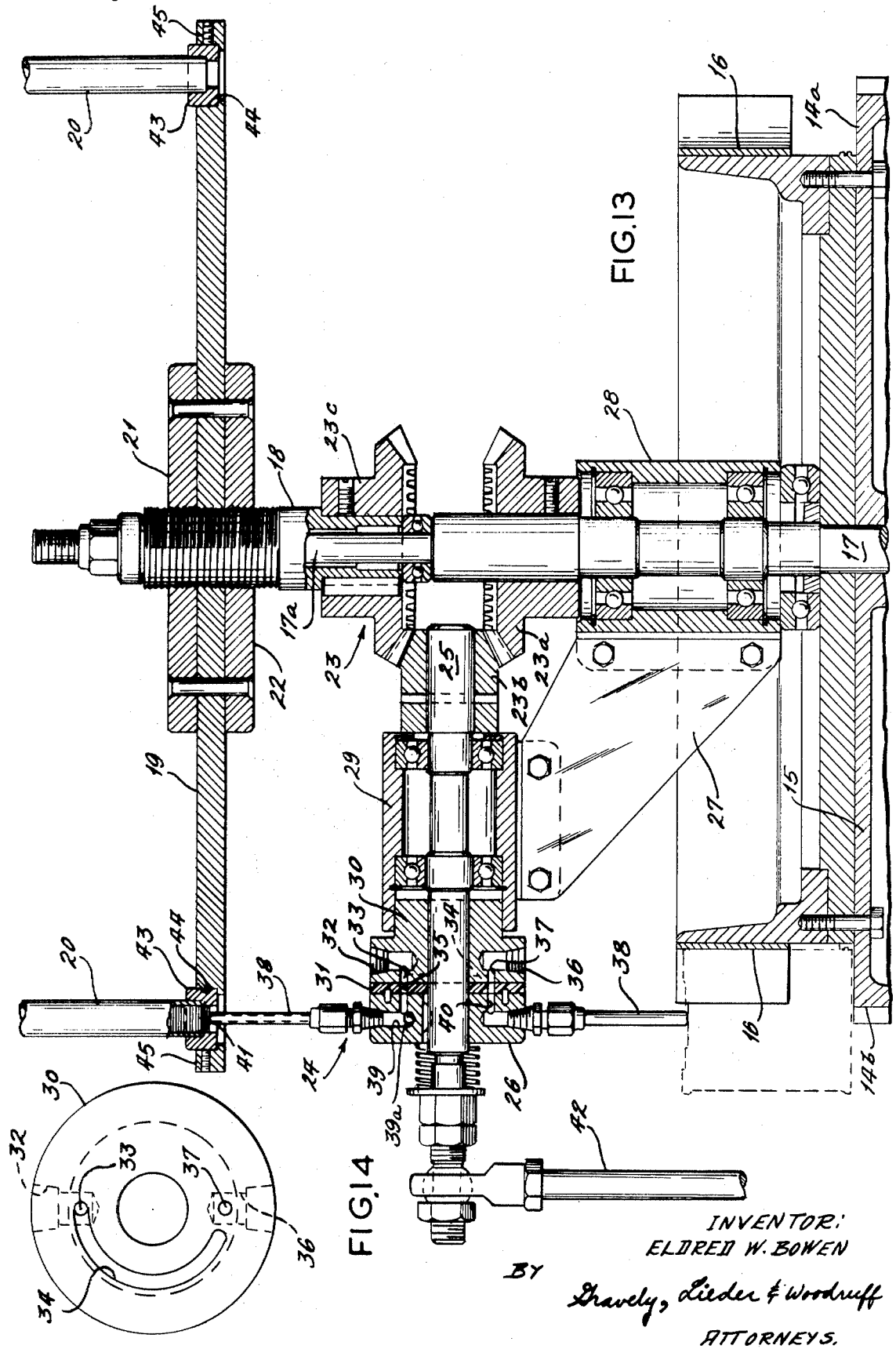

United States Patent Office 3,517,476
Patented June 30, 1970

3,517,476
METHOD AND APPARATUS FOR CLOSING CONTAINERS
Eldred W. Bowen, Brentwood, Mo., assignor to Pet Incorporated, St. Louis, Mo., a corporation of Delaware
Filed Apr. 27, 1967, Ser. No. 634,280
Int. Cl. B65b 3/04
U.S. Cl. 53—37                                                        12 Claims

ABSTRACT OF THE DISCLOSURE

A foil lined plastic adhesive patch for covering the filling holes of evaporated milk cans and a mechanism for applying feed patches in high-speed plant production. The apparatus comprises a filler cell where the can is filled with milk, a cleaning wheel, a patch feeder transfer wheel, and a preheater transfer wheel to a patch sealing wheel where the patch is heated and pressure is applied simultaneously to seal the patch over the filling hole.

BACKGROUND OF THE INVENTION

One of the principal difficulties in evaporated milk canning has been the soldering of the filler opening to seal the can after it is filled with fluid. In the sealing of the can openings, occasionally pellets of solder have been deposited within the fluid and this is unsatisfactory as far as users are concerned. Accordingly, one of the principal objects of the present invention is to provide a can patch for sealing filling openings in evaporated milk can lids without the use of solder. Another object of the present invention is to provide a method and mechanism for efficiently, rapidly, and inexpensively applying and sealing the aforesaid patch to the can end.

These and other objects and advantages will become apparent hereinafter.

SUMMARY OF THE INVENTION

This invention comprises a foil patch for applying over the filling opening in an evaporated milk can lid by means of a thermo-plastic adhesive positioned on the undersurface of the patch. The invention further comprises a can lid of improved profile having a protective rim around the periphery of the patch defining a well in which the patch is seated to protect the patch from being inadvertently removed from the can end.

This invention also comprises a mechanism and method for applying the can patch to the end of the filled can.

DESCRIPTION OF THE DRAWINGS

FIG. 2 is an elevational view of a can patch applying mechanism;

FIG. 3 is a plan view of a can lid having a seal patch applied;

FIG. 4 is an enlarged sectional view taken along line 4—4 of Fig 3;

FIG. 5 is a view similar to FIG. 4 showing a modified can patch;

FIG. 8 is a schematic arrangement of the electrical system for the sealer;

FIG. 9 is a schematic arrangement of the air system for the sealer;

FIG. 10 is an enlarged sectional view of a further modification of can lid and seal patch;

FIG. 11 is an enlarged sectional view of still another modification of can lid and seal patch;

FIG. 12 is a vertical sectional view showing an improved can lid;

FIG. 13 is a vertical sectional view of the patch applicator wheel; and

FIG. 14 is a front view of the distributor hub of the patch applicator.

DETAILED DESCRIPTION

Figure 6:
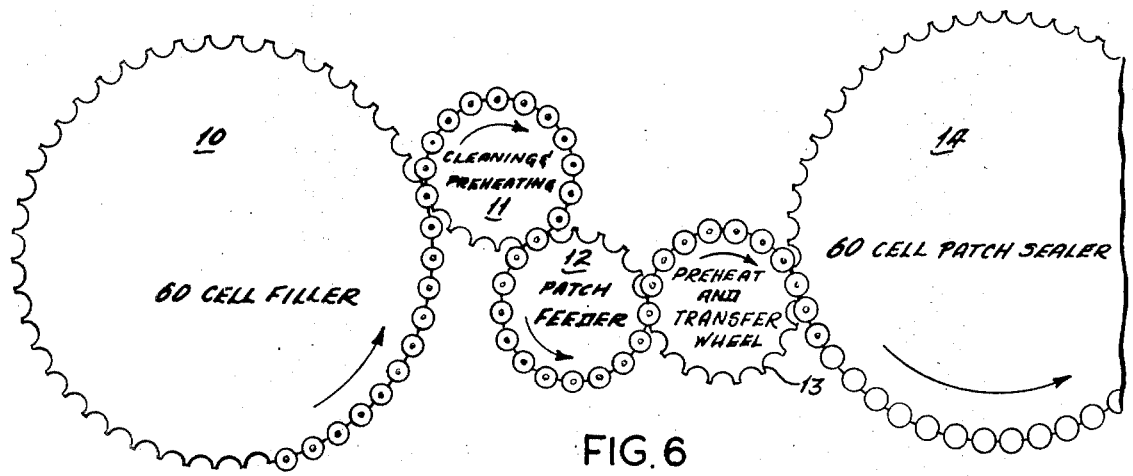
FIG. 6 is a plan layout of the filling and sealing sequence.

The assembled evaporated milk cans which have bottoms and lids soldered to cylindrical sides are positioned in a 60 cell rotating table 10 known as a filler (FIG. 6). The lids each are provided with central filling opening, and in turn, the cans are passed beneath filling heads (not shown) where they are filled with evaporated milk. This equipment is conventional in an evaporated milk processing plant. From the filler head, the cans are passed to a 20 cell rotating steam cleaner 11 (which could be an air cleaner). At this station 11, the can top is exposed to live steam to clean excess milk and any other foreign matter which may have accumulated thereon. This is conventional in present operations. From the steam cleaner 11 the filled cans are passed to a 20 cell rotating patch feeder 12. The directions of rotation of the various tables are indicated by the arrows in FIG. 6. The patch feeder assembly 12 applies can patches loosely over the can lid openings, and is shown in more detail in FIG. 13 and will be described hereinafter. From the patch feeder 12, the cans are moved by a 20 cell preheat and transfer wheel 13 to a patch sealer table 14 where the patches are secured to the top of the can lid. At the station 14, the patches and can lids are preheated by a flame or the like and the adhesive on the underside of the patch softened slightly to position the patch securely to the can top. This preheat also allows the patches to be sealed in the patch station 14 more readily.

Figure 1:
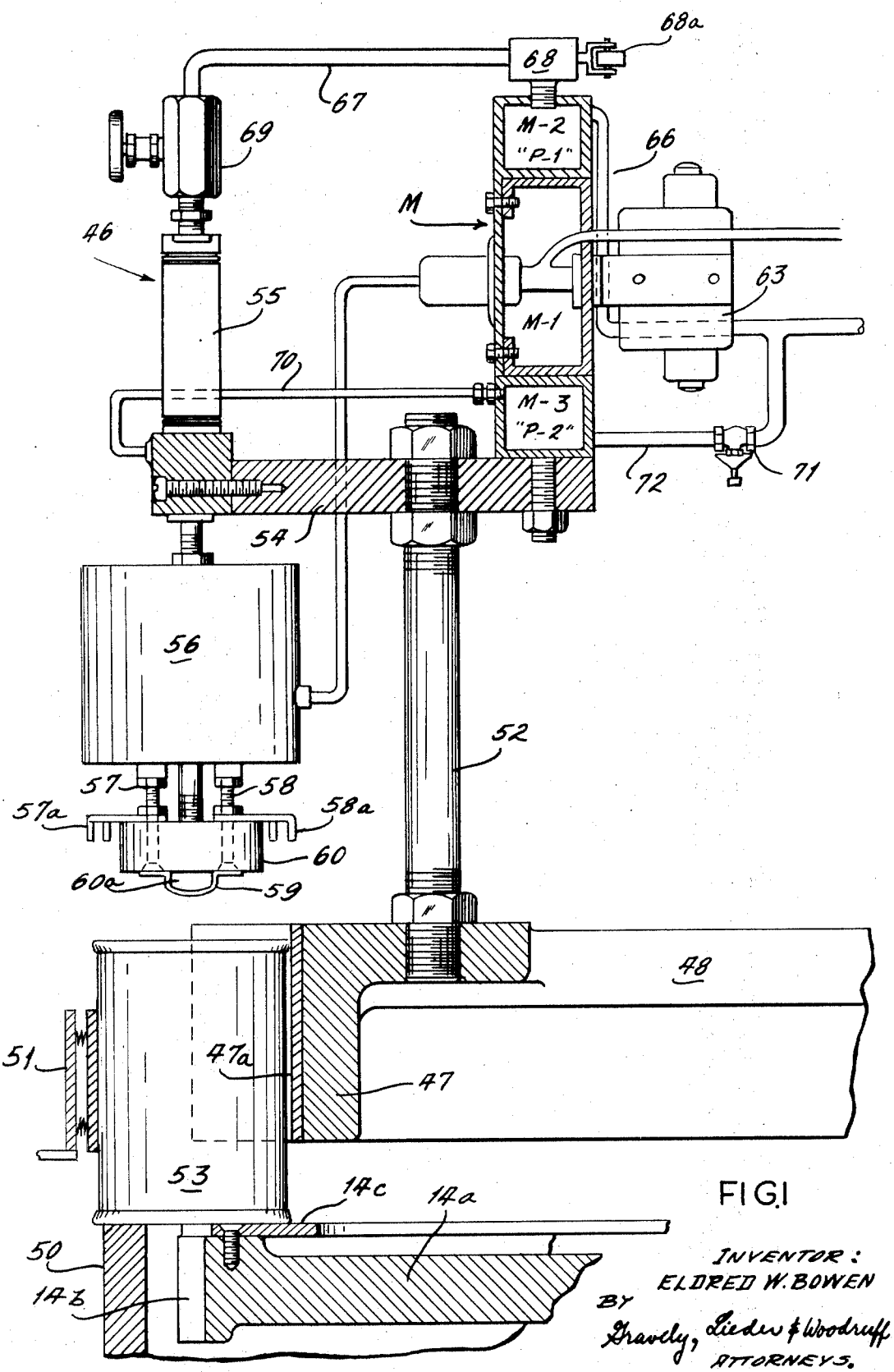
FIG. 1 is a vertical sectional view, partly in elevation of the patch sealing mechanism.

As the cans with the patches loosely positioned thereon rotate around the patch station 14, pressure is applied by the heat sealer, heat is turned on to the heat sealer to heat the patch, the patch is cooled with pressure still on, and the cans are discharged to a sterilizing unit. The details of the heat sealing assembly are shown in FIG. 1 and will be described hereinafter.

PATCH FEEDER

The patch feeder assembly 12 is shown in FIG. 13 and includes a main lower rotating table 15 having cells 16 on the outer periphery thereof. The table 15 is driven by a main shaft 17. The shaft 17 extends upwardly through the table 15 and at its upper reduced portion 17a mounts a feeder disc shaft 18 which has attached thereto an oppositely rotating can patch magazine table 19. The magazine table 19 includes a series of can patch magazines 20 positioned around the outer periphery thereof and aligned with the center of the can cells 16 on the can table 15. The upper table 19 is sandwiched between a pair of feeder discs securing nuts 21 and 22 so as to be adjustable upwardly or downwardly on the feeder disc shaft 18 with respect to the lower table 15. The tables 15 and 19 are timed to rotate at the same speed but in opposite directions by means of the miter gear 23 positioned at the top of the lowermost shaft portion 17 and the bottom of the uppermost shaft portion 17a.

The bevel gear 23 includes a lower portion 23a keyed to the lower shaft 17 and having 40 teeth, an intermediate portion 23b having 20 teeth and an upper portion 23c keyed to the hollow feeder disc shaft 18 and having 40 teeth.

Positioned between the magazine table 19 and the can table 15 is a patch transfer mechanism 24. The mechanism 24 includes a shaft 25 pinned to the intermediate gear portion 23b and having a distributor head 26 adjacent to its outer end.

A gusset 27 is connected to a main shaft bearing housing 28 around the main shaft 17 and also is connected to a feeder shaft bearing housing 29 around the feeder shaft 25.

The feeder shaft bearing 29 is keyed to a supply hub 30 positioned around the main shaft 25 adjacent to the distributor hub 26 and separated therefrom by a Teflon gasket 31 which rotates with the distributor hub 26. The supply hub 30 is connected through a port 32 to a vacuum source. A connecting conduit 33 communicates the port 32 to a curve manifold slot 34 which extends about 180° in the face of the supply hub 30. The manifold slot 34 is aligned with openings 35 in the gasket 31. Facing the supply hub 30 (FIG. 14), the slot 34 extends from about 198° to 360°.

An opening to atmosphere or a slight positive pressure supply port 36 also is provided in the supply hub 30. The port 36 communicates with a slot 37 which terminates in the face of the supply hub 30 at a point spaced from and circumferentially aligned with the slot 34. The operation of these ports will be described hereinafter.

The distributor hub 26 is keyed to the feeder shaft 25 and rotates therewith. The distributor hub 26 is provided with ten hollow placer tubes 38 which are threaded into ports 39 drilled in the distributor hub 26. Conduits 40 communicate each of the ports 39 with the gasket openings 35 and therefore also with the vacuum slot 34 and with the pressure conduit 37 so as to provide a source of vacuum or pressure to the placer tubes 38.

As the feeder shaft 25 rotates, each of the placer tubes 38 is connected to vacuum immediately prior to its coming beneath a supply tube 20 so as to engage and maintain a disc 41 on the end of the placer tube 38. The vacuum is maintained as the distributor hub 26 rotates because of constant communication of the conduit 40 with the vacuum slot 34. Immediately prior to the engagement of the patch 41 with the top of a can in a pocket 16, the conduit 40 passes the end of the vacuum slot 34 and engages the pressure conduit 37. Therefore, the patch 41 from the end of the feeder tube 38 is dropped onto the top of the can in the pocket 16.

A ball valve 39a of smaller diameter than the conduit 39 but of sufficient size to seal the conduit 35 rests in each of the conduits 39 and seals the conduit 35 if a patch 41 is lost from the end of a tube 38 to preserve the vacuum in the rest of the system.

A torque arm 42 is fixed to the frame of the machine and provides outboard support for the feeder shaft 25 and prevents rotation of the feeder mechanism 24.

The supply tubes 20 are provided with supply tube mounting sleeves 43 positioned to fit in openings 44 formed around the peripheral edge of the feeder disc 19 and held therein by a set screw 45. The mouth of the mounting sleeve 43 is a die that is used to form the patches 41 and are punched directly into the supply tube 20. When a supply tube 20 is empty, the mounting sleeve 43 and supply tube 20 are removed from the opening 44 and a new full tube 20 and its sleeve 43 are positioned in the vacated opening 44. Alternately, filled supply tubes 20 can be placed in the sleeves 43. The plurality of feeder heads or tube 20 provides reliability at high speeds. If one tube 20 should fail, only one can in 20 is lost in production.

The rotation of the pocket wheel 15, the feed shaft 25 and the feeder disc 19 are timed so that the can patches 41 are removed from the magazine 20 and carried around and deposited in the center opening of a filled can end at the rate of 250–500 cans per minute.

SEALER CONSTRUCTION

Figure 7:
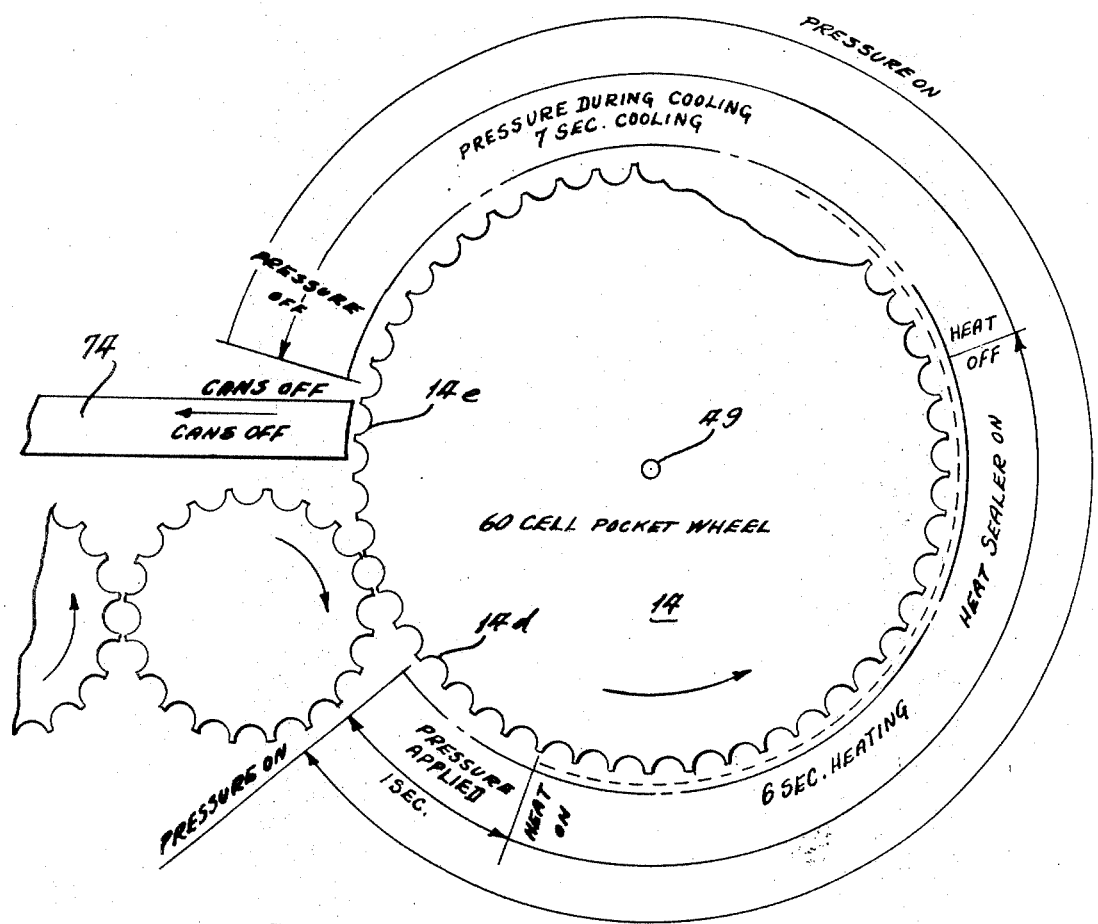
FIG. 7 is a schematic layout of a cycle through the can sealing process as the can and patch progress around the wheel.

The heat sealer mechanism is shown in FIGS. 1, 7, 8 and 9 and includes as many heat sealers 46 as there are cells 47 on the pocket wheel 14. Each of the cells 47 is lined with a stainless steel insert 47a. The sealing table 14 includes a main gear 14a having teeth 14b on the outer periphery and a steel plate 14c fixed to the upper surface to seat the cans 53. The can cells 47 are on the outer ends of arms 48. The gear 14a and the arms 48 rotate about a center hub 49 which contains the main electrical and air supply. A main drive motor (not shown) drives the gear 14a. An outboard support 50 supports the can 53 until the heating element 46 engages the top of the can 53. A fixed outer retainer 51 is spaced outwardly from the cans 53 on the table 14 and extends over about 300° of the circumference of the table 14. The entrance area 14d and the exit area 14e are open and it is here that the cans 53 enter on and are removed from the table 14 (FIG. 7).

A post 52 threaded on both ends is positioned on each arm 48 and vertically adjustably mounts an air cylinder mounting arm 54 to which the heat sealer mechanism 46 is affixed. The mechanism 46 includes a pneumatic cylinder and piston 55 which has a heat sealing construction on the end of the piston rod. The heat sealer construction itself comprises a transformer 56 and two secondary leads 57 and 58 and a circular annular heating element 59 which engages the upper surface of a seal positioned on a can lid beneath the mechanism 46.

Connected to the leads 57 and 58 are heat sinks 57a and 58a, which dissipate excess heat from the heating element 59. The heating element 59 is positioned around a heat insulating and electrically insulating member 60 which includes a circular leading portion 60a shaped to fit within a recess in the can top and to there engage the patch 41 so as simultaneously to apply pressure and heat to the patch 41 to thereby seat the patch 41, seal the patch 41 to the can 53 and maintain the pressure on the can top while the patch 41 cools. The portion 60a is a section of a cylinder with the outer end being outwardly curved or outwardly dished to be sure that the heating element 59 engages the seal 41 all around the can opening.

The heating element 59 (FIG. 8) comprises a circular central portion 59a having a central round opening 59b and opposed outwardly extending lead connecting portions 59c which each have diverging sides 59d and a dished aperture 59e in the connecting edge 59f.

The electrical supply for the heat sealer is shown schematically in FIG. 8 and includes a voltage source connected to the transformer 56 by variable voltage control 61 and slip rings 62. The slip rings 62 connect to the supply in the central hub 49. A switch 63 establishes and interrupts voltage to the transformer 56 by means of fixed switch activators (not shown) as the heat sealer 46 rotates with the table 14. A main elecrical and air manifold M is mounted on a rearward extension of the mounting arm 54 and rotates therewith. The manifold M is circular and extends around the center hub 49. The manifold M is in three sections M–1 being the electrical manifold and housing electrical supply to each transformer 56 and its on-off switch 63.

As mentioned, the heating element 59 comprises a circular doughnut shaped central portion 59a having triangularly shaped outwardly flared leads 59c connected thereto. This arrangement provides maximum heat dissipation and sufficient heat to provide efficient effective sealing.

FIG. 9 is a schematic of the air supply and control system. A regulated line supply 64 connects to a valve 65 which dispenses a pressure P1 to the system. This can be varied depending on the requirement for pressure which is to be applied to the can patch 41. A rotary seal 65a in the outer hub 49 supplies the pressure P1 to the system through a conduit 66. A header or manifold M–2 is positioned on the electrical manifold M–1 and supplies energizing air to all of the air cylinders 55. A three-way air valve or switch 68 (operated by a cam switch 68a as the switch 68 rotates with the table 14, the cam not being shown) communicates and interrupts air pressure to the action side of the actuator cylinder 55 through a cylinder actuating supply conduit 67. A metering valve 69 is positioned in the line 67 to control the speed of operation of the piston in its downward stroke. The piston does not reach the end of its stroke before engaging the can top to insure constant equal pressure sealing on the foil.

The reaction conduit 70 receives a constant pressure P2 (less than P1) from a manifold M-3 which reecives this air pressure from a constant pressure reducing valve 71 positioned in conduit 72 between it and conduit 66 from the center hub 49. The pressure P2 overcomes the gravity of the sealer piston and returns it to its inactive position when the valve 68 interrupts the acting pressure to the cylinder 55. Thus the pressure P2 constantly acts against the piston and must be overcome when the valve 68 supplies the pressure P1 to the action side of the piston.

As seen in FIG. 7, when the can 53 having a patch positioned in the central opening of the lid enters a pocket 47 on the heat sealing wheel 14 from the transfer wheel 13, pressure P1 is applied to the piston of the heat sealer 55 and the heat seal head 60 seats the can patch firmly on the can lid. This takes about 1 second. Current is applied by closing the switch 63 and the heat sealer element 59 heats up. Current is supplied to the sealer element 59 for about 6 seconds, which is sufficient time to melt the thermo-plastic adhesive on the underside of the can patch and cause it to flow by reason of the pressure applied by the heat sealer and to firmly seat the patch over the lid central opening. At this point, the switch 63 is opened, and the heat leaves the heat seal element 59 by means of the heat sinks 57a and 58a. Pressure is maintained in the cylinder 55 for about 7 seconds, while the patch cools and the thermo-plastic adhesive sets. At this point the valve 68 is opened to atmosphere and the return pressure P2 diengages the heat sealer head 60 from the can lid. All of the foregoing has occurred as the can 53 is in its pocket 47 and as the table 14 rotates carrying the can 52 around the sealing station. The can 53 with the patch 41 secured thereto leaves the table 14 at the exit station 14e by means of the exit chute 74.

CAN LID STRUCTURES

In addition to the novel can patch 41 which comprises an outer foil 75 of hard aluminum or other suitable material, and an inner thermo-plastic adhesive 76 which is inactive in the presence of evaporated milk and which seals to metal and melts at 500–900° F., the present invention also comprises the can lid structure 77 shown in FIG. 12. This improved can lid includes an outer rim 78 having a raised shoulder 79 around the outer periphery of the can lid upper surface. A flat horizontal portion 80 is adjacent to the shoulder 79 and is connected by an inclined shoulder 81 to a second lower inwardly disposed horizontal portion 82 wihch in turn is connected by an inclined shoulder 83 to a third wider innermost flat horizontal portion 84. An oppositely inclined raised rim 85 terminates in a raised edge 86 connected to a reversely inclined conical surface 87 which terminates in a depressed flat horizontal central surface 88 having a central can filling opening 89 formed therein. The opening is ⅛–⅜″ in diameter. The can patch 41 is positioned in the depressed portion 88 and when the heat is applied, the thermoplastic adhesive 76 flows so as to fill the space between the ends of the can patch 41 and the shoulder 87 and also tends to flow around the vertical surface 89 which defines the fill opening. This effectively seals all the metal surfaces which might cause contamination if in contact with the milk within the can 53 and also prevents there being any exposed edges on the can patch 41 which could be loosened to remove the patch 41.

FIG. 4 shows a can patch 41 positioned in a depression in a can lid 77c with the adhesive flowed around the outer edges of the foil 75.

In the embodiment shown in FIG. 5, the can patch foil portion 75 has a central portion 75a which is pushed partly into the fill opening 89. This is not always necessary for effective sealing but has some advantages in certain situations. This helps insure that adhesive covers the fill opening edges 89.

FIG. 10 shows a modification of the arrangement wherein the can end 77a has a spiral groove 90 cut into its upper surface. This is filled by the can patch adhesive 76 and tends to cause the patch 41 to stick more firmly to the can top 77a.

FIG. 11 shows a further embodiment of the present invention wherein the central portion 88a of the can top 77b is inclined at 10° from the horizontal between the central opening 89 and the conical surface 87. This provides additional strength for the can patch 41.

It has been found using hard aluminum foil patches of 5 mil thickness that ⅛″ overlap of the patch on the can around the fill opening is necessary for good adhesion after sterilization.

The can patch is below the surface of the can lid to prevent the patch from being rubbed or scraped off the can lid during sterilization when the can ends engage each other.

This invention is intended to cover all changes and modifications of the examples of the invention herein chosen for purposes of the disclosure, which do not constitute departures from the spirit and scope of the invention.

What is claimed is:
1. A method of closing the end of metal containers without soldering comprising:
  (a) filling a metal container having ends and side walls through an opening in one end of the container,
  (b) heating the container top prior to applying a cover patch over said opening,
  (c) positioning a cover patch over the can end opening, said patch being of metal foil having a thermoplastic adhesive on the undersurface to secure the patch to the can end,
  (d) lightly attaching the cover patch to the container top prior to the application of pressure to the outer surface of the cover patch,
  (e) applying heat and pressure to the patch to urge the same against the can end to thereby provide a seal, and
  (f) maintaining pressure on the patch after discontinuing heating to firmly secure the patch to the can lid as the seal cools.

2. A method of closing the end of metal containers without soldering comprising positioning empty cans one by one on a rotating table beneath filling nozzles filling each of the cans as the can moves with the table, transferring the filled can to a smaller rotating wheel, cleaning the top of the can at this wheel as the can moves within the wheel, transferring the can to another rotating table, applying circular patches to the can top loosely over the fill opening, transferring the can and patch to a third rotating table, preheating the patch and can end to lightly adhere the can patch over the fill opening, transferring the can and patch to a final rotating table of the same diameter as the fill table, positioning the can on the periphery of the table, applying pressure to the patch to seat the patch firmly around the can lid opening, heating the patch while maintaining the pressure to seal the patch to the can top, cooling the patch while maintaining the pressure, and discharging the sealed can from the said final table.

3. A machine for closing the fill hole in the end of filled metal containers comprising:
  (a) a filling station including means for filling the containers through an opening in the lid,
  (b) cleaning and preheating means for cleaning and preheating the container tops prior to applying patches thereto,
  (c) a patch applying station including means for loosely positioning a metal foil patch having a thermo-plastic adhesive backing over the lid opening, (d) and a patch attaching station including means for heating and forcing the patch into engagement with the container top to seal the patch around the lid opening.

4. The machine of claim 3 wherein the stations are synchronized rotating wheels having container receiving receptacles on their outer peripheries, the filling station having fill means vertically aligned with each such receptacle and the patch attaching station having a heating element and pressure applying means vertically aligned with each station, the patch applying station including an oppositely rotating patch storage wheel having stacks of patches on the outer periphery and a rotating hub having tubes communicating with a source of vacuum and aligned with the patch stacks and the container lid openings to pick up a patch from stacks and deposit the same over a container lid opening.

5. The machine of claim 3 wherein the patch applying station comrises a main driven shaft, a lower table rotatable with the shaft and having circularly aligned pockets to hold the containers, an oppositely rotatable upper table having stacks of patches circularly aligned around the periphery thereof, means for rotating said upper table, and means for transferring said patches from the stacks to the containers as both are oppositely rotating.

6. The machine of claim 5 wherein the transfer means comprises a central horizontal rotatable shaft, a distributing hub on the shaft rotatable therewith, a fixed supply hub adjacent to the distributing hub and surrounding the shaft but not rotatable therewith, a series of tubes projecting from the distributing hub and aligned with the article stacks and with the receptacles, conduits in the distributing hub communicating with the tubes, seal means between the distributing hub and supply hub having openings therethrough communicating with said conduits in the distributing hub, a manifold in the face of the supply hub communicating within the seal openings as the corresponding tube passes beneath a stack and terminating immediately prior to the said tube becoming aligned with a receptacle, conduit means in the supply hub communicating the manifold with a vacuum source, and a port in the supply hub aligned with the seal openings after the termination of the manifold to break the vacuum on the tube and deliver the article to the receptacle.

7. The device of claim 6 wherein the main shaft includes a reduced upper section, a feed table bushing rotatable with respect to the upper section and surrounding the upper section, the feed table being vertically adjustably mounted on the upper section, a bevel gear mounted between the upper and lower sections of the main shaft, the lower portion of said gear being keyed to the main shaft, the intermediate portion driving the horizontal shaft and upper portion being keyed to the rotatable bushing and driving the upper table.

8. The device of claim 6 wherein the patch stacks comprise combination magazines and dies, the upper table being provided with circumferentially aligned counterbored openings therethrough, the magazines and dies each including an enlarged head positioned in the counterbore, means to releasibly retain the head in the counterbore, the opening in the head being of the diameter of the article whereby the articles may be punched from a sheet using the opening as a die and deposited in a tubular magazine extending from the opposite side of the head, the emptied die and magazine being replaceable with a filled magazine and die.

9. The machine of claim 7 including a bearing housing around the horizontal shaft, means tying the housing to the supply hub, a bearing housing around the main shaft, means tying the housings together and outboard support means for the horizontal shaft to prevent external movement of the horizontal shaft with respect to the main shaft.

10. The machine of claim 3 wherein the patch attaching station includes a hollow rotatable main shaft having sources of electric power and hydraulic pressure positioned therein, a table rotatable with the main shaft, a series of article receiving stations on the table, a plurality of heat sealers vertically aligned with the article receiving stations, means for mounting the heat sealers to rotate in alignment with the article receiving stations, a manifold for delivering electric power and pneumatic pressure to each of the heat sealers, and means to transfer the said electric power and pneumatic pressure from the main shaft to the manifold.

11. The machine of claim 10 wherein each of the sealers comprises: a pneumatic cylinder having a vertically positioned operating piston rod, a heat seal element mounted for movement with the piston rod, and a transformer connected to the heating element.

12. The machine of claim 11 wherein the manifold is a hollow circular member surrounding the center shaft, said station including a bracket mounted on the center shaft having a series of curved article engaging pockets aligned with the stations on the table, support means mounted on the bracket, platform means mounted on support means, the manifold being mounted on the platform means, means for communicating a high pneumatic operating pressure to one side of the cylinder from a high pressure chamber of the manifold, means to interrupt said operating pressure, means to communicate a constant lower pressure to the other side of the cylinder, and means to energize and deenergize the electrical heat sealer element.

References Cited

UNITED STATES PATENTS

| Re.25,962 | 2/1966 | Wheaton | 53—167 |
| 2,223,480 | 12/1940 | Darling | 53—82 |
| 2,621,841 | 12/1952 | Simpson | 53—279 |
| 3,309,836 | 3/1967 | Hallowell | 53—39 |
| 3,364,652 | 1/1968 | Groth et al. | 53—282 |

FOREIGN PATENTS 1,070,918  6/1967  Great Britain.

THERON E. CONDON, Primary Examiner

R. L. SPRUILL, Assistant Examiner

U.S. Cl. X.R.

53—39, 167, 279, 282